(12) United States Patent
Sarawate et al.

(10) Patent No.: US 10,280,777 B2
(45) Date of Patent: May 7, 2019

(54) SYSTEM AND METHOD INCLUDING A CIRCUMFERENTIAL SEAL ASSEMBLY TO FACILITATE SEALING IN A TURBINE (71) Applicant: General Electric Company, Schenectady, NY (US)

(72) Inventors: Neelesh Nandkumar Sarawate, Niskayuna, NY (US); Norman Arnold Turnquist, Carlisle, NY (US); Christopher Edward Wolfe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 714 days.

(21) Appl. No.: 14/577,549

(22) Filed: Dec. 19, 2014

(65) Prior Publication Data
US 2016/0177762 A1 Jun. 23, 2016

(51) Int. Cl.
*F01D 11/00* (2006.01)
*F02C 3/04* (2006.01)
*F01D 11/02* (2006.01)
*F16J 15/08* (2006.01)
(Continued)

(52) U.S. Cl.
CPC .......... *F01D 11/005* (2013.01); *F01D 11/001* (2013.01); *F01D 11/02* (2013.01); *F02C 3/04* (2013.01); *F01D 11/003* (2013.01); *F05D 2240/55* (2013.01); *F05D 2240/57* (2013.01); *F16J 15/0812* (2013.01);
(Continued)

(58) Field of Classification Search
CPC ... F01D 11/005; F01D 11/001; F16J 15/0812; F16J 15/0887; F16J 15/02; F16J 15/021; F16J 15/022; F05D 2240/55; F05D 2240/57
See application file for complete search history.

(56) References Cited

U.S. PATENT DOCUMENTS

| 5,797,723 A | 8/1998 | Frost et al. |
| 5,915,697 A | 6/1999 | Bagepalli et al. |
| 6,162,014 A | 12/2000 | Bagepalli et al. |

(Continued)

OTHER PUBLICATIONS

Chupp et al., "Gas Turbine Engines: Seals", Encyclopedia of Aerospace Engineering, Dec. 15, 2010.

*Primary Examiner* — Justin D Seabe
*Assistant Examiner* — Behnoush Haghighian
(74) *Attorney, Agent, or Firm* — Ann M. Agosti (57) ABSTRACT A method and system including a circumferential seal assembly for sealing between components within a turbine is provided. A circumferential seal assembly is disposed in a slot extending circumferentially about an inner barrel. The seal assembly includes a first shim layer and at least one additional shim layer configured in an overlapping stacked configuration so as to stagger the end portions of each of the shim segments defined by the shim layers, relative to one another and circumferentially about the seal assembly. One or more cloth layers are configured wrapping about the first shim layer and the at least one additional shim layer to define a sealing member having a first sealing surface and a second sealing surface. The assembly further including a base plate, wherein the sealing member is disposed on an upper surface of the base plate to provide for sealing engagement between the components of the turbine.

15 Claims, 7 Drawing Sheets (51) Int. Cl.
*F16J 15/10* (2006.01)
*F16J 15/12* (2006.01)

(52) U.S. Cl.
CPC .......... *F16J 15/0887* (2013.01); *F16J 15/104* (2013.01); *F16J 15/122* (2013.01)

(56) References Cited

U.S. PATENT DOCUMENTS

| | | |
|---|---|---|
| 6,164,656 A | 12/2000 | Frost |
| 6,402,466 B1 | 6/2002 | Burdgick et al. |
| 6,464,457 B1 | 10/2002 | Morgan et al. |
| 6,547,257 B2 | 4/2003 | Cromer |
| 6,609,885 B2 * | 8/2003 | Mohammed-Fakir ............... F01D 9/041 415/191 |
| 6,648,333 B2 | 11/2003 | Aksit et al. |
| 6,652,231 B2 | 11/2003 | Vedantam et al. |
| 6,659,472 B2 | 12/2003 | Aksit et al. |
| 6,984,106 B2 | 1/2006 | Thompson |
| 7,040,857 B2 | 5/2006 | Chiu et al. |
| 7,338,253 B2 | 3/2008 | Nigmatulin |
| 8,613,451 B2 | 12/2013 | Samudrala et al. |
| 2013/0106066 A1 | 5/2013 | Sarawate et al. |
| 2013/0170979 A1 * | 7/2013 | Sha ............... F01D 11/001 415/229 |

* cited by examiner

SYSTEM AND METHOD INCLUDING A CIRCUMFERENTIAL SEAL ASSEMBLY TO FACILITATE SEALING IN A TURBINE

BACKGROUND

The present disclosure relates generally to rotary machines, and, more specifically, to methods and apparatus for use in providing sealing between components within a turbine.

At least some known rotary machines, such as gas turbines, include a plurality of seal assemblies in a fluid flow path to facilitate increasing the operating efficiency of the gas turbine. For example, some known seal assemblies are coupled between a stationary component and a rotary component to provide sealing between a high-pressure area and a low-pressure area. In addition, at least some known gas turbines include at least one stator vane assembly and at least one rotor blade assembly that collectively form a stage within the gas turbine. In at least some known gas turbines, seals are provided between static components in adjacent stages, or between components within a stage.

In a turbine, e.g., a gas turbine, the compressor section includes a stationary inner barrel formed of two semi-cylindrical halves secured one to the other generally along a horizontal midline forming an annulus. The aft end of the inner barrel is secured to a compressor discharge casing which provides support for the nozzle support ring supporting the first-stage nozzles. The inner barrel, in part, segregates a high-pressure region external to the barrel from a lower pressure region within the barrel and about the rotor. One or more guide vanes are mounted stationary to an outer casing of the compressor in the last stages of the compressor section. The one or more guide vanes and the inner barrel are engaged so as to define a radial gap therebetween. A seal engages with the inner barrel during operation so as to preclude leakage flow therethrough. However, thermal expansion of one or more of the inner barrel, the guide vanes and the outer casing during operation of the turbine can leave a gap of sufficient dimension between the one or more guide vanes and the inner barrel to allow for leakage flow therethrough. As a consequence, leakage paths can and do appear between the one or more guide vanes and the inner barrel. A need has therefore arisen to minimize or eliminate any such leakage paths in a manner which is tolerant to thermal transient movement during turbine operation.

BRIEF DESCRIPTION

In one aspect, a compressor seal for a turbine is provided. The compressor seal includes, a circumferential seal assembly disposed in a slot extending circumferentially about a cylindrical barrel with the seal assembly having a substantially arcuate shape. The seal assembly including a first shim layer and at least one additional shim layer, one or more cloth layers configured wrapping about the first shim layer and the at least one additional shim layer and a base plate. Each of the first shim layer and the at least one additional shim layer define a shim segment having opposed end portions. The first shim layer and at least one additional shim layer are configured in an overlapping stacked configuration so as to stagger the end portions of each of the shim segments relative to one another and circumferentially about the seal assembly. The one or more cloth layers are configured wrapping about the first shim layer and the at least one additional shim layer. The one or more cloth layers, the first shim layer and the at least one additional shim layer defining a sealing member having a first sealing surface and a second sealing surface. The sealing member is disposed on an upper surface of the base plate to provide for sealing engagement between the second sealing surface of the sealing member and the base plate.

In another aspect, a method for assembling a gas turbine is provided. The method including providing a first component of a gas turbine, wherein the first component includes a circumferentially extending slot defined therein an outer surface, providing a second component of a gas turbine, wherein the second component is disposed adjacent to the first component so as to define a radial gap therebetween the first component and the second component and disposing a circumferential seal assembly within the circumferentially extending slot. The circumferential seal assembly is configured for sealing the radial gap to prevent a leakage flow therethrough. The circumferential seal assembly includes a first shim layer and at least one additional shim layer, each defining a shim segment having opposed end portions and configured in an overlapping stacked configuration so as to stagger the end portions of each of the shim segments relative to one another and circumferentially about the seal assembly. One or more cloth layers are configured wrapping about the first shim layer and the at least one additional shim layer to define a sealing member. The sealing member is disposed on an upper surface of a base plate to provide for sealing engagement between a first sealing surface of the sealing member and the second component and a second sealing surface of the sealing member and the base plate.

In still another aspect, a gas turbine system is provided. The gas turbine system including a compressor section, a combustor assembly coupled to the compressor section and a turbine section coupled to the compressor section. The compressor section includes a seal assembly for use in sealing between a first component and a second component. The first component is disposed relative to the second component to define a radial gap therebetween. The seal assembly is disposed therein the radial gap. The seal assembly includes a first shim layer and at least one additional shim layer. Each of the first shim layer and the at least one additional shim layer defining a shim segment having opposed end portions. The first shim layer and the at least one additional shim layer are configured in an overlapping stacked configuration so as to stagger the end portions of each of the shim segments relative to one another and circumferentially about the seal assembly. The seal assembly further including one or more cloth layers and a base plate. The one or more cloth layers are configured wrapping about the first shim layer and the at least one additional shim layer. The one or more cloth layers, the first shim layer and the at least one additional shim layer defining a sealing member having a first sealing surface and a second sealing surface. The base plate is disposed within a slot defined circumferentially about the second component. The sealing member is disposed on an upper surface of the base plate to provide for sealing engagement with the first component and the second component.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise. As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the turbine. It should also be appreciated that the term "fluid" as used herein includes any medium or material that flows, including, but not limited to gas and air.

Figure 1:
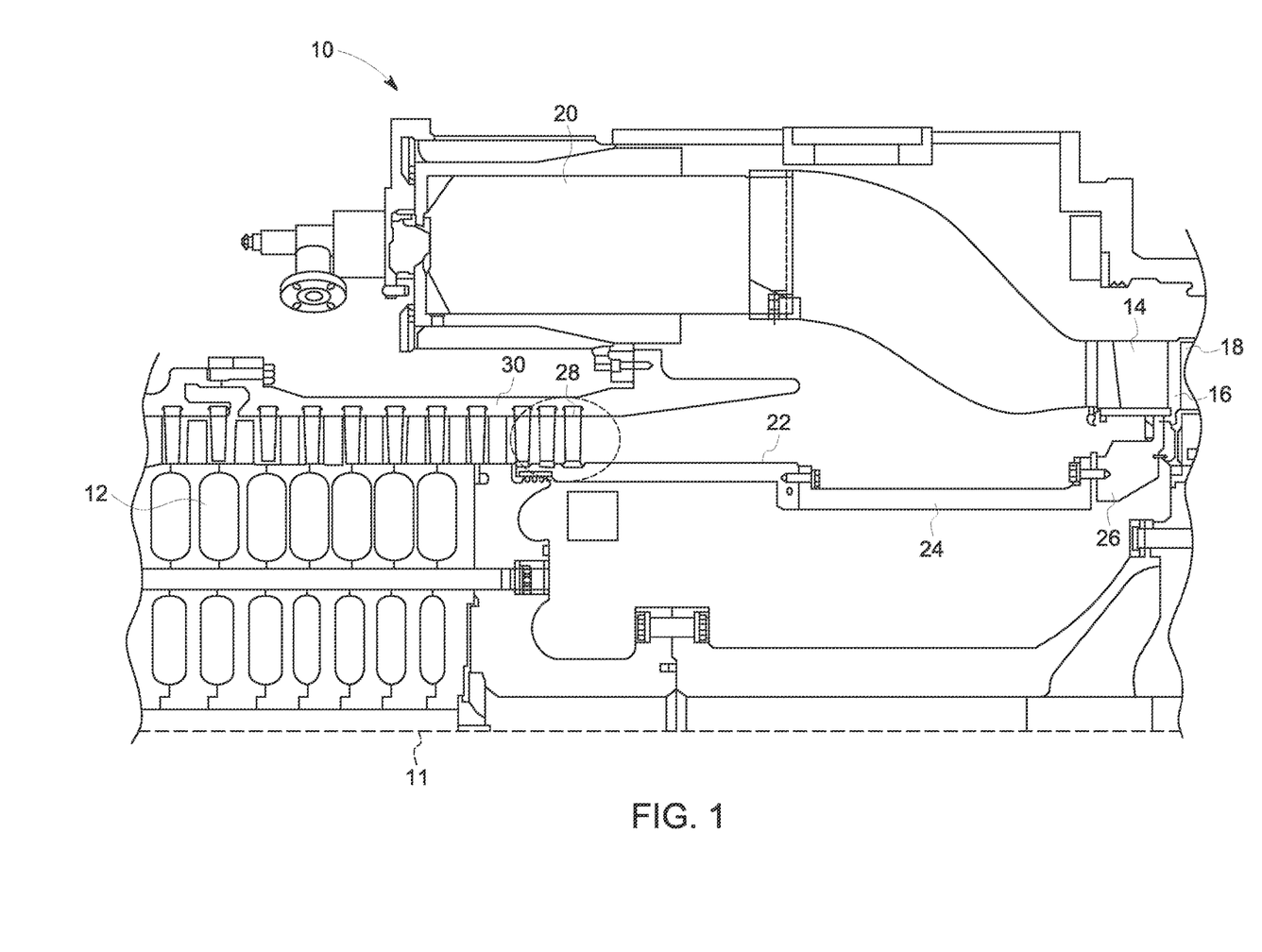
FIG. 1 is a schematic cross-sectional view of an upper half of a portion of a turbine illustrating an inner compressor, in accordance with one or more embodiments shown or described herein.

Referring now to the drawings, particularly to FIG. 1, there is illustrated a portion of a turbine, generally designated 10, having a compressor section 12, a turbine section 14, including first-stage nozzles 16 and buckets 18, and one of a plurality of combustors 20 spaced circumferentially one from the other about the turbine, and about an axis 11. It will be appreciated that the compressor 12 provides compressed air for mixing with fuel in each of combustors 20 of the annular array thereof to provide hot gases of combustion from the combustors to the turbine section 14 to drive the turbine rotor. As is conventional, the compressor is provided with an inner compressor discharge case or inner barrel 22 and a compressor discharge casing 24. Casing 24 interconnects the inner barrel 22 and a first-stage nozzle support ring 26. One or more guide vanes 28 are mounted stationary to an outer casing 30 of the compressor section 12. The one or more guide vanes 28 and the inner barrel 22 are disposed so as to define a radial gap therebetween (described presently). A seal (described presently) is disposed between the one or more guide vanes 28 and the inner barrel 22 to engage with the inner barrel 22 and the one or more guide vanes 28 during operation so as to preclude leakage flow therethrough.

The turbine 10 may use natural gas, various types of syngas, and/or other types of fuels. The turbine 10 may be one of any number of different turbines offered by General Electric Company of Schenectady, N.Y. and the like. The turbine 10 may have other configurations and may use other types of components. Other types of turbines also may be used herein. Multiple turbines 10, other types of turbines, and other types of power generation equipment also may be used herein together. Other types of rotary machines also may be used herein.

Figure 2:
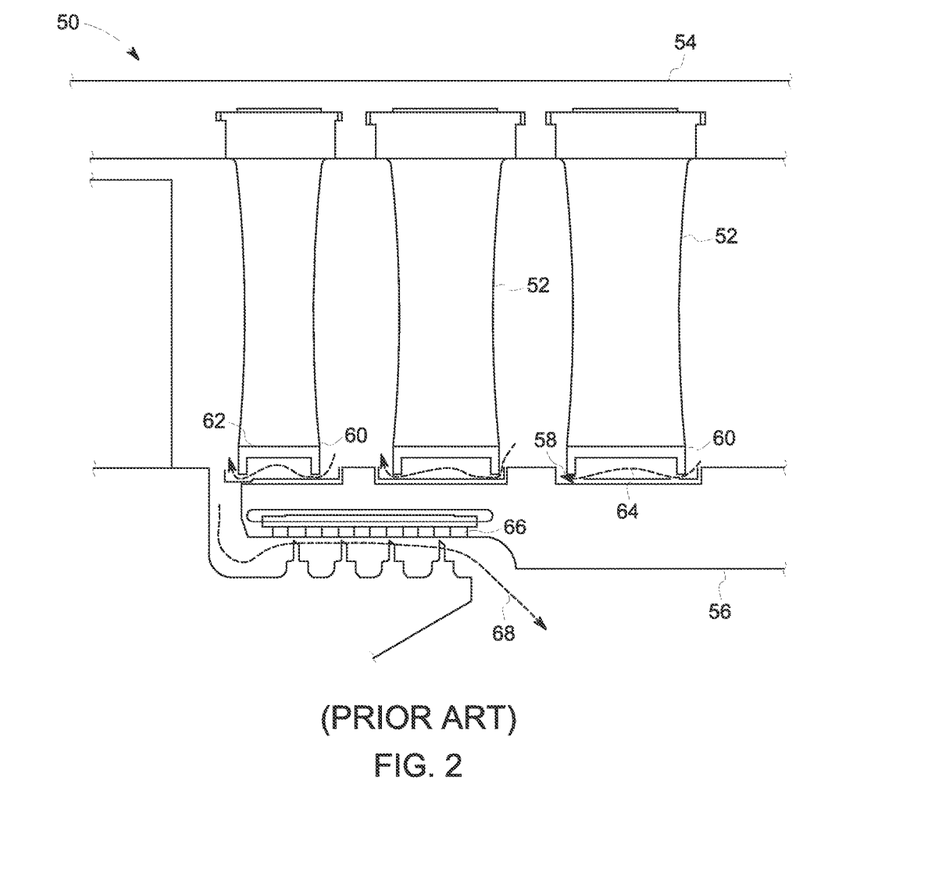
FIG. 2 is a schematic cross-sectional view of a portion of a turbine inner compressor as known in the art.

FIG. 2 is an enlarged view of a portion of a prior art compressor 50, typically found in a turbine, generally similar to turbine 10 (shown in FIG. 1) indicating leakage flows therethrough. More specifically, illustrated are one or more guide vanes 52, generally similar to the one or more guide vanes 28 of FIG. 1, mounted to an outer casing 54 so as to engage with an inner barrel 56 and define a gap 58 therebetween. Each of the one or more guide vanes 52 includes a tip shroud 60 at a distal end 62 of a respective guide vane 52. Guide vane shroud leakage 64, as indicated by dotted line, is present via the gap 58 formed between each of the tip shrouds 60 and the inner barrel 56 of the compressor 50. During operation, thermal expansion of one or more of the inner barrel 56, outer casing 54 and one or more guide vanes 52 may cause the gap 58 to enlarge and/or shift axially increasing the guide vane shroud leakage 64. The majority of the guide vane shroud leakage 64 will feed a pressure packing seal (HPPS) 66 to create a HPPS leakage flow 68. In some instances, the HPPS leakage flow 68 may be employed to provide cooling to downstream portions of a turbine section (not shown), generally similar to turbine section 14 of FIG. 1.

Figure 3:
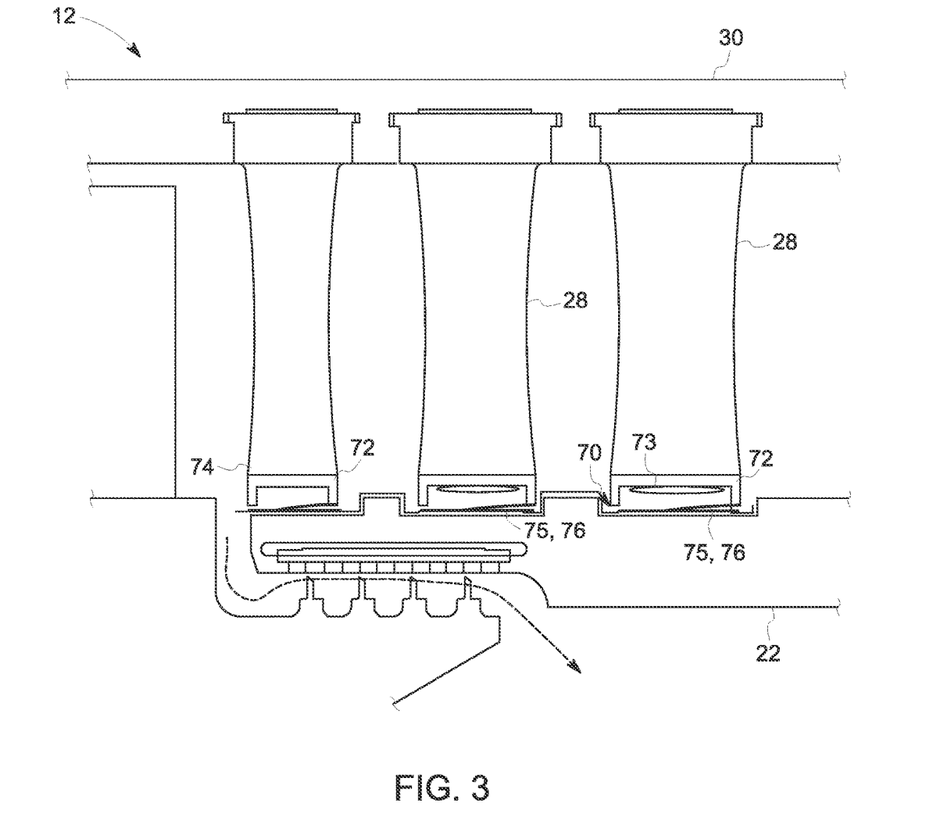
FIG. 3 is a schematic cross-sectional view of a portion of the turbine inner compressor of FIG. 1, in accordance with one or more embodiments shown or described herein.

Referring now to FIG. 3, illustrated is a portion of the compressor section 12 of FIG. 1, as indicated by the dotted line. Illustrated are the one or more guide vanes 28 disposed circumferentially about an axis 11 (shown in FIG. 1) and mounted in a stationary manner to the outer casing 30. The one or more guide vanes 28 are mounted to the outer casing 30 so as to engage with the inner barrel 22 and define a radial gap 70 therebetween. As previously described with respect to FIG. 2, each of the one or more guide vanes 28 includes a tip shroud 72 at a distal end 74 of a respective guide vane 28. In an embodiment, the tip shroud 72 may further include a weld protrusion 73. To minimize and or preclude guide vane shroud leakage flow between the tip shrouds 72 and the inner barrel 22, a compressor seal 75, and more particularly a circumferential seal assembly 76, as described herein, is employed.

Figure 4:
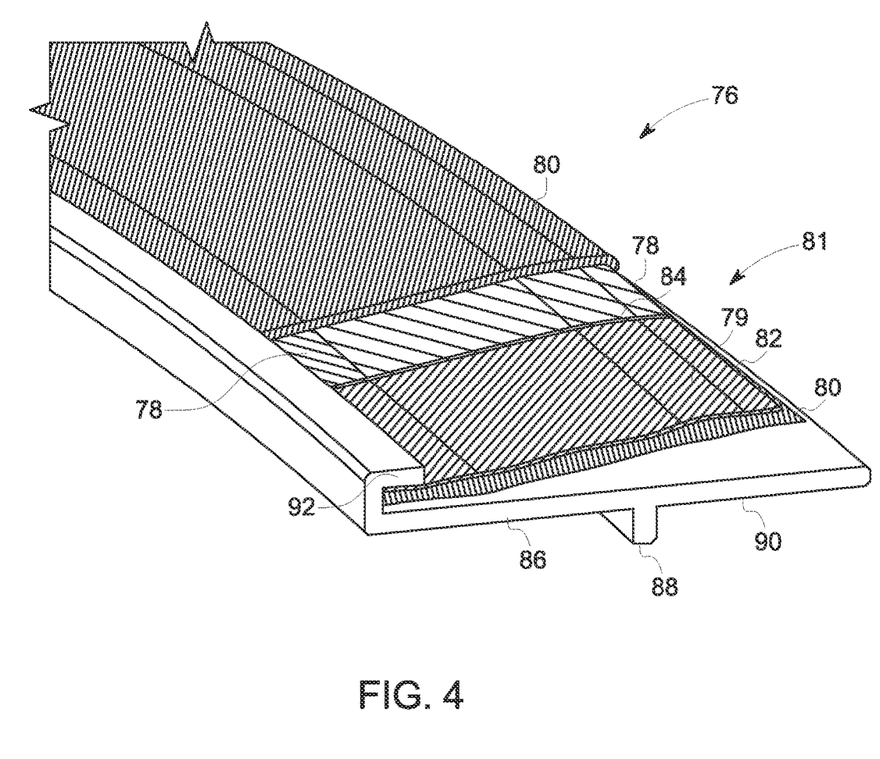
FIG. 4 is a schematic isometric view with parts in cross-section of a seal assembly, in accordance with one or more embodiments shown or described herein.
Figure 5:
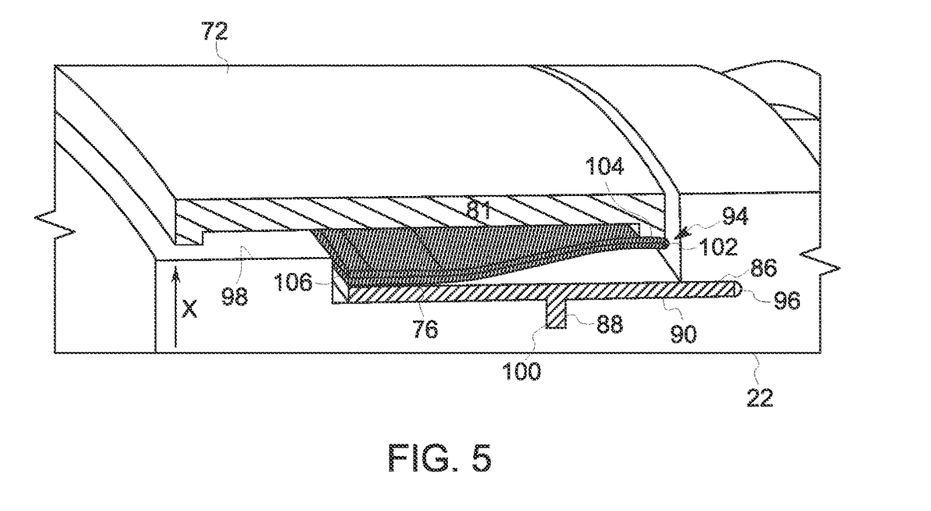
FIG. 5 is a schematic isometric view with parts in cross-section of the seal assembly of FIG. 4 disposed in an inner barrel, in accordance with one or more embodiments shown or described herein.

In accordance with a preferred embodiment of the present disclosure, the circumferential seal assembly 76 is provided between one or more of the tip shrouds 72 and the inner barrel 22. Referring more specifically to FIGS. 4 and 5, illustrated in isometric views, wherein a portion of the disclosed layers are illustrated as removed, is the seal assembly 76. The seal assembly 76 is comprised of a plurality of shim layers, and in particular a first shim layer 78 and at least one additional shim layer 79. The first shim layer 78 and the at least one additional shim layer 79 are wrapped within one or more cloth layers 80 to form a sealing member 81. In an embodiment, the first shim layer 78 and the at least one additional shim layer 79 may be made from stainless steel or other types of materials. In an embodiment, the one or more cloth layers 80 may be out of a woven metallic cloth. The one or more cloth layers 80 also may include composites, ceramics, and combinations thereof. The one or more cloth layers 80 may be spot welded (not shown) to the first shim layer 78 and the at least one additional shim layer 79 or otherwise attached. Each of the first shim layer 78 and the at least one additional shim layer 79 define a shim segment 82 including opposed end portions 84, to reduce curvature stresses in the shim layers. During fabrication, the first shim layer 78 and the at least one additional shim layer 79 are assembled in a stacked manner so as to stagger the end portions 84 of each of the shim segments 82 and thus preclude the formation of gaps therebetween and provide sealing so as to preclude the passage therethrough of a leakage flow. In the exemplary embodiment, the stacked shim segments 82 span circumferentially about axis 11 (shown in FIG. 1), such that each stacked shim segment 82 has an arcuate configuration. In one embodiment, two stacked shim segments 82, each extending approximately one hundred eighty degrees (180°), are provided. In another embodiment, four stacked shim segments 82, each extending approximately ninety degrees (90°), are provided. In other embodiments, any number of stacked shim segments 82 are used that enable the seal assembly 76 to function as described herein. The layering and segmenting of the circumferential seal assembly 76 provides resistance against pressure, while retaining the flexibility of the assembly 76. As previously described, the stacked shim segments 82 are wrapped by the one or more cloth layers 80 to form the sealing member 81.

The circumferential seal assembly 76 further comprises a base plate 86 onto which the sealing member 81, and more specifically, the first shim layer 78 and the at least one additional shim layer 79 wrapped in the one or more cloth layers 80 are disposed. In an embodiment, the base plate 86 is formed of a material having a thermal expansion similar to that of the inner barrel 22 and/or the tip shroud 72. In an embodiment, the base plate 86 is machined to include registering features and provide for sealing engagement with the inner barrel 22. More particularly, as best illustrated in FIG. 4, the base plate 86 includes a registering protrusion 88 extending therefrom a lower surface 90. In addition, in an embodiment, the base layer may include a flange 92 for engagement and registering of the sealing member 81, and more specifically, the first shim layer 78 and the at least one additional shim layer 79 wrapped in the one or more cloth layers 80.

To provide a seal 94 between the tip shroud and the inner barrel 22, in an embodiment an elongated circumferential inner barrel slot 96 is formed in an outer surface 98 of the inner barrel 22. As best illustrated in FIG. 5, additional registering features may be machined into the inner barrel 22, such as a registering groove 100, and configured to engage with registering protrusion 88 of the base plate 86. As previously indicated, the seal assembly 72 is configured circumferentially extending about the inner barrel 22. The base plate 86 is configured for disposal in the registering groove 100, thereby providing the seal 94 configured circumferentially about the inner barrel 22, and between the inner barrel 22 and the shroud tip 72. The dimensions of the groove 100 and registering protrusion 88 may be optimized according to the design of the circumferential seal assembly 76 and adjacent components. In an alternate embodiment, alternate registering and/or mating features may be included for positioning of the base plate 86 and the inner barrel 22, relative to one another. In addition, additional or alternative retainment means for retaining the base plate 86 within the elongated circumferential inner barrel slot 96 may be used, such as a wax, or the like.

Referring again to FIG. 4, as previously indicated the seal assembly 76 includes the first shim layer 78 and the at least one additional shim layer 79. More particularly, the seal assembly 78 includes two or more metal shim layers 78 and 79, of which two are illustrated, configured as shim segments 82 that are stacked in a staggered manner. As illustrated in FIG. 4, the first shim layer 78 and the at least one additional shim layer 79 are provided with a covering of the one or more cloth layers 80, such as a metallic woven cloth, secured about and/or to the first shim layer 78 and the at least one additional shim layer 79. As previously indicated, the cloth, as well as the first shim layer 78 and the at least one additional shim layer 79, may be formed of a variety of metal materials such as stainless steel. In the exemplary embodiment, the seal assembly 76, and more particularly the sealing member 81, is a compression-style sealing member. As used herein, the term "compression-style" refers to a sealing member that when maintained in a constant state of compression, provides sealing between adjacent members. In the exemplary embodiment, one or more cloth layers 80 is fabricated from a woven metal material, such as a high-temperature nickel-cobalt alloy, or any other suitable material that provides increased wear resistance for the first shim layer 78 and the at least one additional shim layer 79 and enables the seal assembly 76 to function as described herein. In one embodiment, the one or more cloth layers 80 include at least two separate layers of cloth material wrapped about the first shim layer 78 and the at least one additional shim layer 79. In alternative embodiments, more or less layers of cloth material may be used. The wrapping of the one or more cloth layers 80 provides blocking of any leakage flow that penetrates therethrough a front side, by a back side cloth layer. Moreover, in the exemplary embodiment, the first shim layer 78 and the at least one additional shim layer 79 are each fabricated from stainless steel, or any other suitable material that enables the seal assembly 76 to function as described herein. In one embodiment, the first shim layer 78, the at least one additional shim layer 79 and the one or more cloth layers 80 are spot-welded. In an exemplary embodiment, the shim layers 78 and/or 79 are fabricated from the same material as the one or more cloth layers 80, a high-temperature nickel cobalt alloy. In alternative embodiments, any suitable material or materials may be used to fabricate the first shim layer 78 and the at least one additional shim layer 79.

Figure 6:
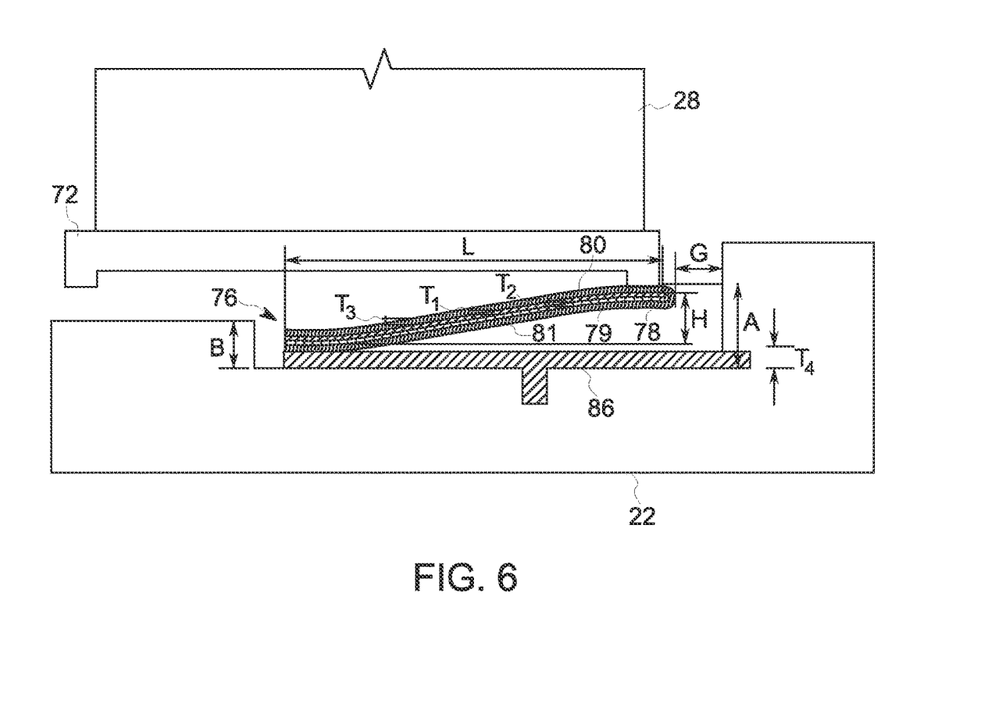
FIG. 6 is a cross-sectional view of the seal assembly of FIG. 4 disposed relative to an inner barrel, in accordance with one or more embodiments shown or described herein.

FIG. 6 is a sectional view of the seal assembly 76. The seal assembly 76 is optimized to provide sealing of adjacent components. More specifically, illustrated is the seal assembly 76 having an overall total seal height "A", the elongated circumferential inner barrel slot 96 having a depth "B", the a first shim layer 78 having a thickness "$T_1$", the at least one additional shim layer 79 having a thickness "$T_2$", the cloth 80 having a thickness "$T_3$", a total shim length of "L", the sealing member 81 having a height "H", an inner barrel gap "G" and a base plate 86 having a thickness "$T_4$". In an exemplary embodiment, L=1.3", H=0.16", $T_1$=0.005", $T_2$=0.010", $T_3$=27 mils (when wrapped two thicknesses equaling 54 mils), $T_4$=65 mils, a minimum value for A=262 mils and a minimum value for B=139 mils.

Referring again to FIGS. 4 and 5, when the seal assembly 76 lies in sealing position, a first sealing surface 102 of the sealing member 81 bears and seals against a lower portion 104 of the tip shroud 72, i.e., the radially inner side wall, of the tip shroud 72. A second sealing surface 106, at an opposed end portion of the sealing member 81, bears and seals against the base plate 86. Consequently, any gaps formed between the tip shroud 72 and the inner barrel 22, are sealed against leakage at operating conditions of the turbine. It will be appreciated that the seal 94 reacts to transient movement of the tip shroud 72 relative to the inner barrel 22, described below, in response to thermal expansion and contraction of one or more of the tip shroud 72, the inner barrel 22 and the base plate 86.

Figure 7:
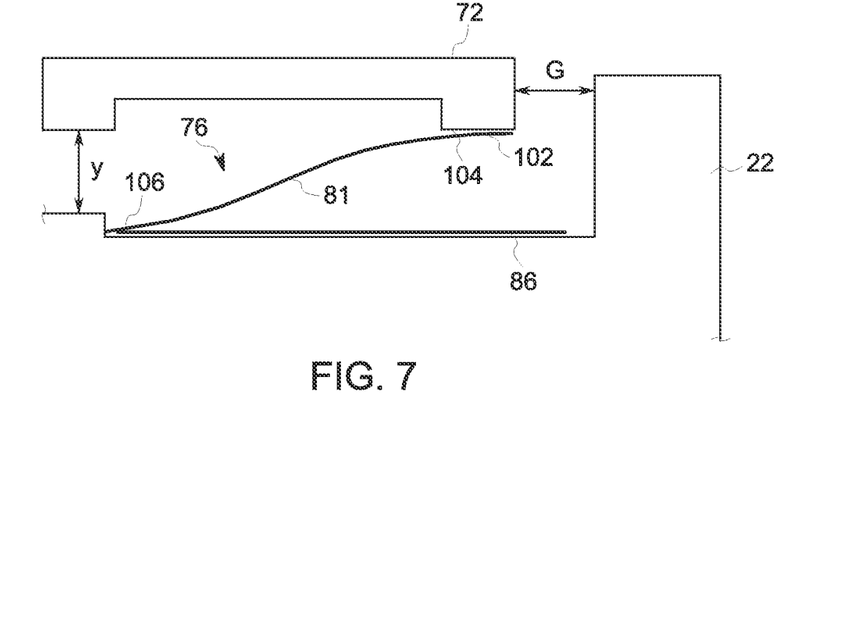
FIG. 7 is a cross-sectional view illustrating a seal assembly position during a state or operation including a maximum thermal transient opening between the tip shroud and the inner barrel, in accordance with one or more embodiments shown or described herein.

Referring now to FIG. 7-10, illustrated are various schematic illustrations showing the seal assembly 76 and sealing between the tip shroud 72 and the inner barrel 22 during operation of the turbine in response to thermal transient movement of the tip shroud 72 relative to the inner barrel 22 and during cold assembly. Referring more specifically to FIG. 7, illustrated is the tip shroud 72 in a first position during operation of the turbine. As illustrated, the tip shroud 72 is positioned an axial distance "G" and a radial distance "y" relative to the inner barrel 22. The first sealing surface 102 of the sealing member 81 bears and seals against a lower portion 104 of the tip shroud 72. The second sealing surface 106 of the sealing member 81 bears and seals against the base plate 86. The seal assembly 76 is configured to maintain line-to-line contact with both the tip shroud 72 and the base plate 86 during a maximum thermal opening, as illustrated by radial distance "y". In this illustrated position, a compression value of the sealing member 81 is equal to zero.

Figure 8:
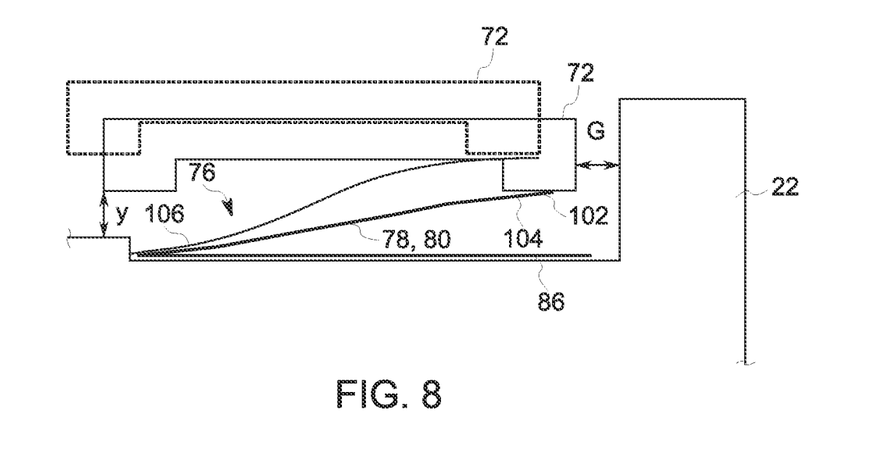
FIG. 8 is a cross-sectional view illustrating a seal assembly position during another state or operation, in accordance with one or more embodiments shown or described herein.
Figure 9:
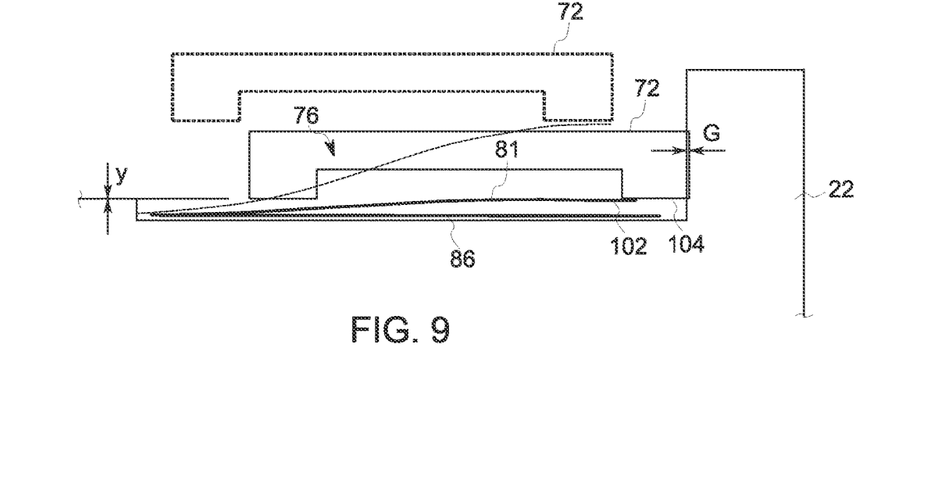
FIG. 9 is a cross-sectional view illustrating a seal assembly position during a state or operation including a maximum thermal transient closure, in accordance with one or more embodiments shown or described herein.
Figure 10:
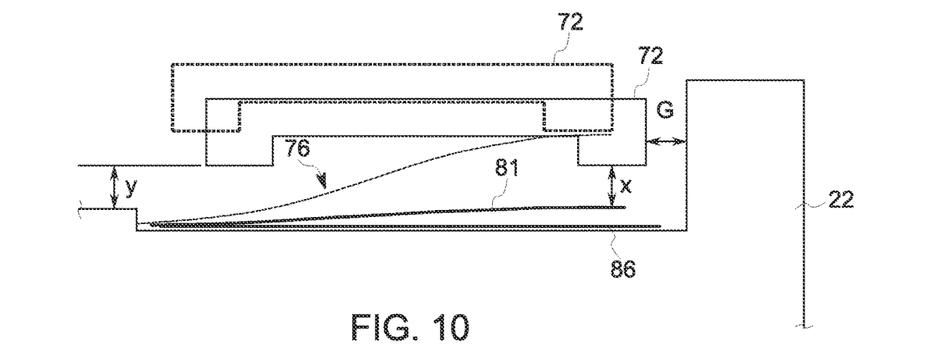
FIG. 10 is a cross-sectional view illustrating a seal assembly position during cold assembly, in accordance with one or more embodiments shown or described herein.

FIG. 8 illustrates the tip shroud 72 in the first position (as shown in dotted line) and in a second position as a result of transient movement and/or expansion of the tip shroud 72 and/or the inner barrel 22 in both a radial and axial direction, as indicated by "y" and "G", in response to thermal conditions. As a result, and as indicated by dotted line, the layered configuration of the sealing member 81 allows for compression so as to maintain line-to-line contact with both the tip shroud 72 and the base plate 86 during the thermal event. FIG. 9 illustrates the tip shroud 72 in the first position (as shown in dotted line) and in a second position as a result of transient movement and/or expansion of the tip shroud 72 and/or the inner barrel 22 in both a radial and axial direction in response to thermal conditions. As a result, and as indicated by dotted line, the layered configuration of the sealing member 81 allows for compression so as to maintain line-to-line contact with both the tip shroud 72 and the base plate 86 during a maximum thermal transient closure, as illustrated by radial distance "y" and axial movement of the tip shroud 72 as evidenced by the axial distance "G" between the tip shroud and the inner barrel 22. The cloth covered first shim layer 78 and at least one additional shim layer 79 (See FIGS. 4 and 5) that form the sealing member 81 are able to accommodate compressive displacement without yielding, and spring back during reversal of the transient condition. FIG. 10 illustrates the tip shroud 72 in the first position (as shown in dotted line) and in a second position during cold assembly conditions of the tip shroud 72 and the inner barrel 22. As a result, and as indicated by dotted line, the sealing member 81, and more particularly the cloth covered first shim layer 78 and the at least one additional shim layers 79, are configured to maintain a gap "x" between the sealing member 81 and the tip shroud 72.

The method of sealing and sealing system described herein provide several advantages over known methods of sealing between components in a turbine, and in particular in an inner compressor of the turbine. For example, the sealing system described herein facilitates the use of simplified sealing structures between adjacent turbine components that is responsive to thermal transient movement of the components. Moreover, the sealing system described herein facilitates controlling leakage flows in gaps defined between components in a turbine, towards facilitating an increase in turbine efficiency.

Exemplary embodiments of a method and a system for sealing between components of a turbine are described above in detail. The method and system are not limited to the specific embodiments described herein, but rather, components of systems and/or steps of the methods may be utilized independently and separately from other components and/or steps described herein. For example, the method may also be used in combination with other rotary machine systems and methods, and are not limited to practice only with turbines or turbine engines as described herein. Rather, the exemplary embodiment can be implemented and utilized in connection with many other rotary machine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the methods and systems described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A compressor seal for a turbine, comprising:
 a circumferential seal assembly disposed in a slot extending circumferentially about a cylindrical inner barrel, the seal assembly having a substantially arcuate shape, the seal assembly comprising;
  a first shim layer and at least one additional shim layer, each of the first shim layer and the at least one additional shim layer defining a shim segment, each of the first shim layer and the at least one additional shim layer extending circumferentially between opposed end portions and extending axially from a first end to a second end, wherein the first shim layer and at least one additional shim layer are configured in an overlapping stacked configuration so as to stagger the respective end portions of each of the first shim layer and the at least one additional shim layer relative to one another and circumferentially about the seal assembly;
  one or more cloth layers wrapped about the first shim layer and the at least one additional shim layer, wherein the one or more cloth layers, the first shim layer, and the at least one additional shim layer define a sealing member having a radial outer sealing surface at the first end and a radial inner sealing surface at the second end; and a base plate, wherein the sealing member is disposed on a radial outer surface of the base plate to provide for sealing engagement between the radial inner sealing surface of the sealing member and the radial outer surface of the base plate.

2. The compressor seal of claim 1, further comprising a tip shroud disposed at a distal end of a guide vane mounted in a stationary relationship to an outer casing and circumferentially thereabout.

3. The compressor seal of claim 2, wherein the seal assembly provides for sealing engagement between the radial outer sealing surface of the sealing member and the tip shroud.

4. The compressor seal of claim 1, wherein the base plate further includes a flange that engages the sealing member.

5. The compressor seal of claim 1, wherein the slot extending circumferentially about the cylindrical inner barrel includes one or more registering grooves and wherein the base plate includes one or more registering protrusions.

6. The compressor seal of claim 5, wherein the one or more registering protrusions extend outward from a radial inner surface of the base plate and circumferentially thereabout.

7. The compressor seal of claim 6, wherein the one or more registering protrusions of the base plate and the one or more registering grooves of the cylindrical inner barrel provide disposing of the seal assembly relative to the cylindrical inner barrel.

8. The compressor seal of claim 2, wherein the seal assembly is configured to compress in response to transient thermal movement of the tip shroud relative to the cylindrical inner barrel.

9. The compressor seal of claim 2, wherein, the seal assembly is configured to maintain line-to-line contact with the tip shroud and the base plate in response to transient thermal movement of the tip shroud relative to the cylindrical inner barrel.

10. The compressor seal of claim 1, wherein the first shim layer and the at least one additional shim layer are comprised of a metallic material.

11. The compressor seal of claim 1, wherein the cloth is a metallic cloth material.

12. A gas turbine system, the system comprising:
a compressor section;
a combustor assembly coupled to the compressor section; and
a turbine section coupled to the compressor section, wherein the compressor section includes a compressor seal assembly according to claim 1 that seals between a first component and a second component, wherein the first component is disposed relative to the second component to define a radial gap therebetween, the compressor seal assembly disposed in the radial gap.

13. The gas turbine system of claim 12, wherein the first component is a tip shroud of a stationary mounted guide vane and the second component is the cylindrical inner barrel of the compressor seal assembly.

14. The gas turbine system of claim 13, wherein the cylindrical inner barrel further includes a circumferentially extending registering groove and the base plate includes a registering protrusion, wherein the registering protrusion of the base plate and the registering groove of the cylindrical inner barrel provide disposing of the compressor seal assembly relative to the cylindrical inner barrel.

15. The gas turbine system of claim 13, wherein the compressor seal assembly is configured to maintain line-to-line contact with the tip shroud and the base plate in response to transient thermal movement of the tip shroud relative to the cylindrical inner barrel.

\* \* \* \* \*